United States Patent
Hansen

(10) Patent No.: US 8,431,068 B2
(45) Date of Patent: Apr. 30, 2013

(54) PROCESS AND DEVICE FOR PRODUCING CONTAINERS FROM THERMOPLASTIC AND A CONTAINER PRODUCED IN THIS WAY

(76) Inventor: Bernd Hansen, Sulzbach-Laufen (DE)

( * ) Notice: Subject to any disclaimer, the term of this patent is extended or adjusted under 35 U.S.C. 154(b) by 899 days.

(21) Appl. No.: 12/318,865

(22) Filed: Jan. 9, 2009

(65) Prior Publication Data

US 2009/0181197 A1    Jul. 16, 2009

(30) Foreign Application Priority Data

Jan. 12, 2008   (DE) .......................... 10 2008 004 088

(51) Int. Cl.
| | |
|---|---|
| B29C 39/02 | (2006.01) |
| B29C 43/02 | (2006.01) |
| B29C 45/00 | (2006.01) |
| B28B 1/00 | (2006.01) |
| B28B 7/00 | (2006.01) |
| B29C 49/00 | (2006.01) |

(52) U.S. Cl.
USPC ........... 264/534; 264/500; 264/523; 264/524; 264/531; 264/533; 264/536; 264/540; 425/353; 425/354; 425/450.1; 425/451.9; 425/522; 425/527; 425/531; 425/532

(58) Field of Classification Search .................. 264/500, 264/523, 531, 534, 535, 537, 539, 540, 524, 264/533, 536; 425/353, 354, 450.1, 451.9, 425/522, 527, 531, 532
See application file for complete search history.

(56) References Cited

U.S. PATENT DOCUMENTS

| | | | | |
|---|---|---|---|---|
| 3,155,281 | A | | 11/1964 | Stracey |
| 3,819,789 | A | * | 6/1974 | Parker ........................... 264/534 |
| 3,843,005 | A | * | 10/1974 | Uhlig ............................ 215/373 |
| 3,946,903 | A | | 3/1976 | Parker |
| 3,949,034 | A | * | 4/1976 | Uhlig ............................ 264/530 |
| 4,035,461 | A | * | 7/1977 | Korth ............................ 264/534 |
| 4,079,111 | A | * | 3/1978 | Uhlig ............................ 264/507 |
| 4,120,927 | A | * | 10/1978 | Nielsen ......................... 264/534 |
| 4,769,206 | A | * | 9/1988 | Reymann et al. ............. 264/534 |
| 6,733,273 | B1 | * | 5/2004 | Hansen ......................... 425/532 |
| 6,749,796 | B1 | * | 6/2004 | Hansen ......................... 264/524 |

(Continued)

FOREIGN PATENT DOCUMENTS

| | | |
|---|---|---|
| DE | 1 479 563 A1 | 4/1969 |
| DE | 6 80 994 U | 4/1969 |

(Continued)

*Primary Examiner* — Christina Johnson
*Assistant Examiner* — Atul P. Khare
(74) *Attorney, Agent, or Firm* — Roylance, Abrams, Berdo and Goodman L.L.P.

(57) ABSTRACT

A process for producing thermoplastic containers (13) extrudes a plastic tube into opened movable mold parts (5, 7, 9). The main mold parts (7) form the container main part (18). The bottom parts are closed to close and weld the tube bottom end. The tube (3) is widened by a pressure gradient acting on it, forcing the tube against the wall of the mold parts (7, 9) to form the container. The mold parts are then moved into the position to open the mold for removal of the formed container (13). The container bottom is made in the form of a cup-like bottom part (19) axially extending into the container main part (18) by the bottom part being everted into the interior of the container (13) to form a bottom elevation (31).

3 Claims, 6 Drawing Sheets

U.S. PATENT DOCUMENTS

| | | | |
|---|---|---|---|
| 7,192,549 B2 * | 3/2007 | Hansen | 264/524 |
| 7,309,463 B2 * | 12/2007 | Hansen | 264/515 |
| 7,357,893 B2 * | 4/2008 | Hansen et al. | 264/525 |

FOREIGN PATENT DOCUMENTS

| | | |
|---|---|---|
| DE | 14 79 563 A1 | 4/1969 |
| DE | 680 994 U | 4/1969 |
| DE | 1 704 209 A | 4/1971 |
| DE | 17 04 209 A | 4/1971 |
| DE | 24 30 654 B2 | 1/1976 |
| DE | 24 44 700 A1 | 4/1976 |
| DE | 27 20 803 A1 | 11/1977 |
| DE | 35 43 082 A1 | 6/1987 |
| FR | 2 508 004 A | 12/1982 |
| FR | 2 591 142 A | 6/1987 |
| FR | 2 591 142 A1 | 6/1987 |
| GB | 911 228 | 11/1962 |
| GB | 911228 A * | 4/1970 |
| JP | 59020629 A * | 2/1984 |
| JP | 08 244749 A | 9/1996 |
| JP | 08 324570 A | 12/1996 |
| JP | 11 042697 A | 2/1999 |
| JP | 2002192602 A * | 7/2002 |
| WO | WO 88/05747 A | 8/1988 |
| WO | WO 2006/034231 A | 3/2006 |
| WO | WO 2006/034231 A1 | 3/2006 |

* cited by examiner

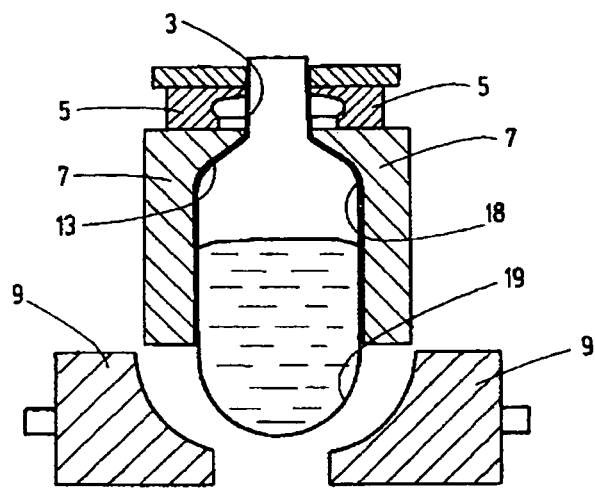
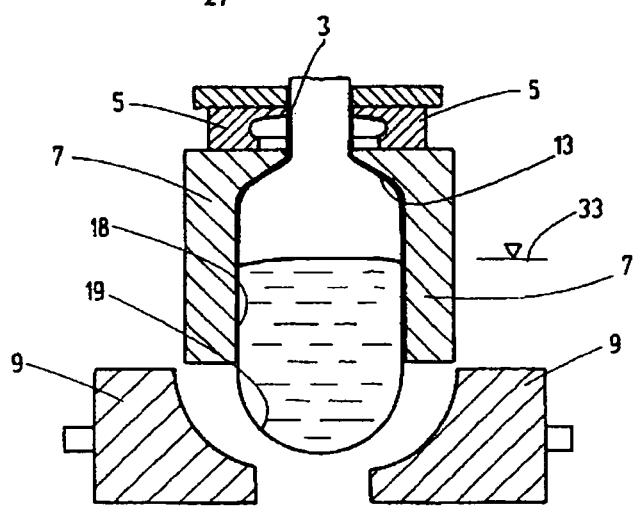
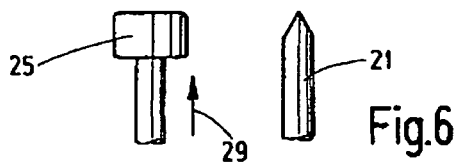

PROCESS AND DEVICE FOR PRODUCING CONTAINERS FROM THERMOPLASTIC AND A CONTAINER PRODUCED IN THIS WAY

CROSS-REFERENCE TO RELATED APPLICATIONS

The present application claims priority to German Patent Application No. DE 102008004088.6, filed on Jan. 12, 2008.

FIELD OF THE INVENTION

The present invention relates to a process for producing containers of thermoplastic in which an extruded plastic tube is inserted into a mold whose movable mold parts are moved into a position which opens the mold. At least the mold parts which form the transition from the main part of the container and the bottom of the container are then closed for the container bottom to be welded. The tube is widened by a pressure gradient acting on it, with the tube being placed against the wall of the mold parts to form the container. The mold parts are moved into the position to open the mold for removal of the formed container from the mold. The present invention also relates to a device for executing the process and a container produced in this way.

BACKGROUND OF THE INVENTION

Processes of this type, such as the Bottelpack® system, are widely used to produce containers of various shapes, sizes, and for different purposes. In particular, they can be transparent, flexible containers of polyethylene or polypropylene. Often the containers are both produced and also filled with sterile contents, such as pharmaceuticals, and sealed in aseptic operation in one process. In particular, when the contents are very expensive, as can be the case for certain pharmaceuticals, for the performance characteristics of the pertinent container it is essential that the contents can be removed in a suitable manner. More precisely, it must be ensured that very expensive media, when they are squeezed out by squeezing the flexible container together, can be forced out of the container without residue and/or that an exact dosage can be delivered, which is essential particularly for pharmaceuticals.

SUMMARY OF THE INVENTION

An object of the invention is to provide a process for producing containers whose performance characteristics are optimized with respect to the removal of the contents.

According to the invention, this object is basically achieved by a blow-fill-seal process, where, in the blow mold, or vacuum mold a cup-shaped bottom part of an axially extending the main part of the container is formed. This bottom part is then everted into the interior of the container, forming a bottom elevation extending into the container interior as a cup open to the exterior on the container bottom. If the contents of this container are to be delivered, the container is compressed from the bottom. This bottom elevation acts as a displacement body moveable into the head region of the container for completely emptying the container and forcing out the volume of contents located therein to minimize the remaining volume.

This complete emptying is especially important in containers in which the main part of the container is made as a bellows pressed together to deliver the contents such that the folds of the bellows come into contact with one another. When this state is reached in the course of squeezing, the bellows, based on the number of folds, has a certain dead length which cannot be shortened by further pressing together. At the end of the process of pressing the bellows together, a considerable residual volume then remains. When the bottom elevation has been formed according to the invention, it is matched in shape and dimensions to this residual volume in the optionally tapered head region of the container. For containers with bellows, the residual volume remaining with the bellows pressed together can also be minimized.

Preferably, the cup-shaped bottom part before final removal of the container from the mold is everted into its interior. Since, in this case, the container is still fixed within the mold, the process of everting in the desired, exactly calibrated manner can be executed without difficulties. Moreover, the eversion process can be carried out in a controlled manner at a temperature level at which the plastic material can still be plastically deformed in a suitable manner to form a residual bottom elevation. Accordingly, it can be advantageous to evert the bottom part before filling the container with the contents, that is, before cooling caused by the contents.

In advantageous embodiments of the process the cup-like bottom part is formed by bottom mold parts which can be moved relative to the main mold parts molding the main part of the container, welding the bottom part in the closed position, and being moved into the position partially opening the mold for everting the bottom part. Everting can then be done by mechanical engagement between the bottom mold parts which are moved apart from one another as required.

In advantageous embodiments, the bottom part is mechanically everted by applying to the bottom part the mold die driven to be movable concentrically to the axis of the container.

In this connection, preferably before everting the bottom part, the scrap material located at its weld is trimmed by a trimming element.

The invention also includes a device for executing the process. The device preferably has movable mold parts forming a blow mold. A pair of mold parts forms the main part of the container and adjoins the pair of bottom mold parts moveable independently thereof. The bottom mold parts in the closed position define a cup-shaped mold cavity for formation of a cup-shaped bottom part axially extending the main part of the container.

Preferably, the bottom mold parts spread the welding jaws for welding the cup-shaped bottom part.

To evert the bottom part into the interior of the container, preferably a plunger can be driven for reciprocal axial motion and can be aligned to the longitudinal axis of the container. By that plunger, the cup-shaped bottom part can be everted into the main part of the container when the bottom mold parts are opened accordingly.

To make available a contact surface free of irregularities for contact of the plunger, in preferred embodiments, a mechanically movable trimming element can be aligned to the longitudinal axis of the container when the bottom mold parts are opened for removing the bottom scrap forming at the weld of the cup-shaped bottom part.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale:

FIG. 5 is a schematic, side elevational view in section of the mold of FIG. 1 in the operating state after trimming the bottom scrap, the bottom mold parts being moved farther apart and a movable trimming element shown in the axially aligned position;

FIG. 6 is a schematic, side elevational view in section of the mold of FIG. 1 in the operating state in which a movable plunger is in the axially aligned position;

DETAILED DESCRIPTION OF THE INVENTION

Figure 1:
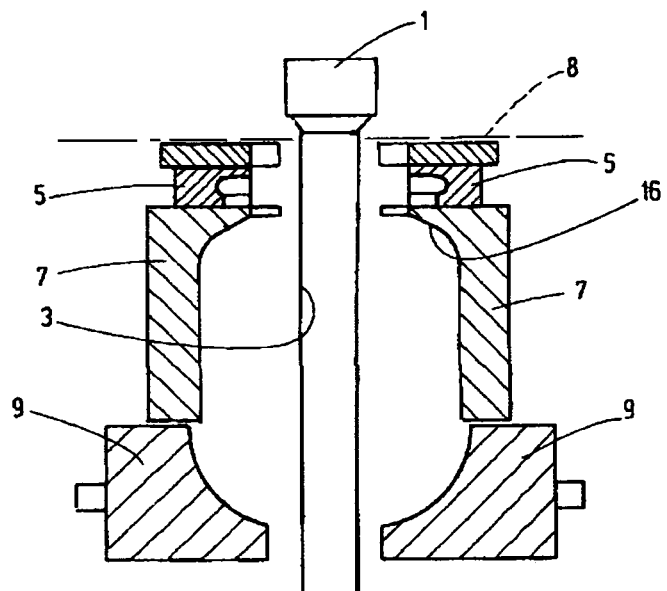
FIG. 1 is a schematic, side elevational view in section of an opened blow mold and an extrusion head located above for forming the tube of plasticized plastic material according to an exemplary embodiment of the invention.

FIGS. 1 to 8 show a part of a device used in the known Bottelpack® system for producing plastic containers in a blow molding process. An extruder 1 extrudes the tube 3 of molten plastic material between movable mold parts of a blow mold shown in FIG. 1 in the opened state. The mold has paired head mold parts 5, main mold parts 7 of the container, and bottom mold parts 9. After extruding the tube 3 into the opened mold, the tube 3 is cut between the nozzle exit of the extruder device 1, and the top of the head mold parts 5. In FIG. 1 the cutting line is shown by a broken line 8.

Figure 2:
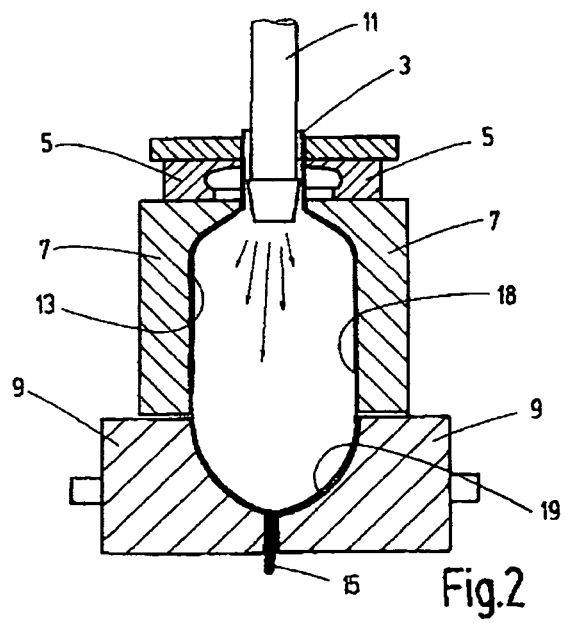
FIG. 2 is a schematic, side elevational view in section of the partially closed blow mold of FIG. 1 in the operating state of widening the tube by air blasts for forming the container welded on the bottom side.

FIG. 2 shows the operating state in which the mold is partially closed by moving the main mold parts 7 and the bottom mold parts 9 together. Instead of the extruder, 1 a blow mandrel 11 is inserted into the upper end of the tube 3 to widen the tube 3 by an air blast and to force it against the mold walls of the main mold parts 7 and the bottom mold part 9 to mold of the container 13. The closed bottom mold parts 9 are provided with welding jaws (not shown in the figure) to weld the tube 3 on the bottom side before blowing in the air blast. The bottom scrap 15 is formed at the bottom weld (FIG. 2). The main mold parts 7 have inner mold walls which are circularly cylindrical over most of their axial length, aside from the head region 16 tapering to the inside (FIG. 1), and bordering the head mold parts 5. The inner mold walls of the bottom mold parts 9 form partial shells in the closed position defining a hemispherical mold. The tube 3 widened by an air blast is then molded into a container 13 having a cup-shaped bottom part 19 formed by the bottom mold parts 9 and connected to the main part 18 of the container as an axial extension. While the bottom mold parts 9 in FIGS. 1 to 6 are shown as partial shells with smooth mold walls, they can also be staggered as steps so that the formed bottom part 19 has bellows-like folds.

Figure 3:
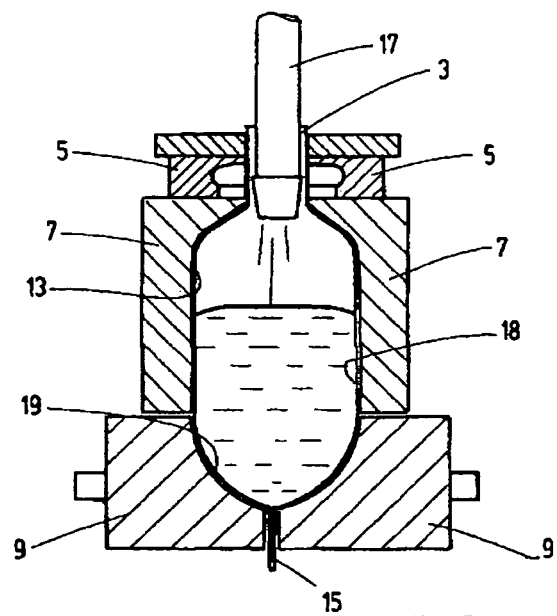
FIG. 3 is a schematic, side elevational view in section of the mold FIG. 1 in the operating state of filling the container with contents.

FIG. 3 shows the state in which the blow mandrel 11 is replaced by a fill mandrel 17 to introduce a predetermined amount of flowable filling material. The mold parts are in the same position as shown in FIG. 2. Instead of using separate mandrels 11 and 17 for blow molding and filling, a combined blow-fill mandrel can be used.

Figure 4:
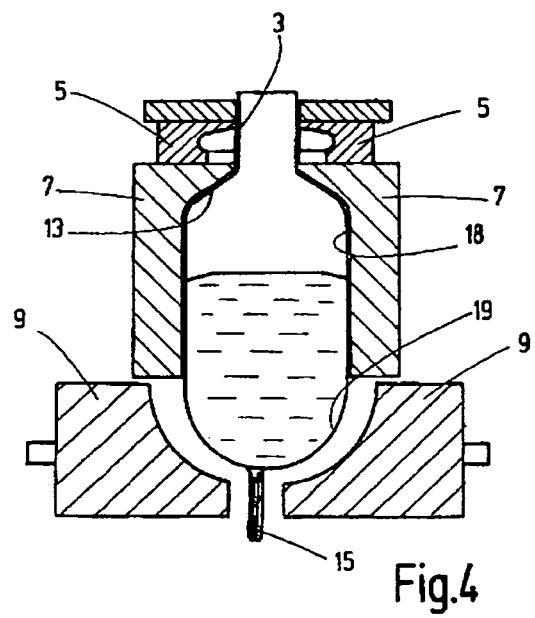
FIG. 4 is a schematic, side elevational view in section of the mold of FIG. 1 in the operating state with bottom mold parts partially moved apart from one another for exposing the bottom scrap on the bottom-side weld.

FIG. 4 shows that while the head mold parts 5 and the main mold parts 7 are in an unchanged position, the bottom mold parts 9 are moved apart out of the closed position by a distance sufficient to make accessible the bottom scrap 15 for a trimming element 21 (shown only in FIGS. 5 and 6). Trimmer element 21 removes the bottom scrap 15 from the bottom part 19.

Figure 7:
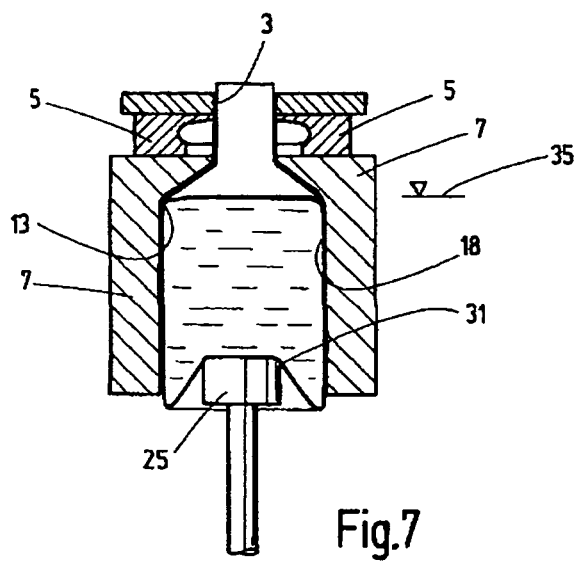
FIG. 7 is a schematic, side elevational view in section of the mold of FIG. 1 in the operating state with the bottom part everted by the plunger and the fill level raised compared to FIG. 6.

FIG. 5 shows the state after removal of the bottom scrap 15. The trimming element 21 can be break-off pins or mandrels moved out of the region of the bottom mold parts 9 after the completed trimming process. Compared to FIG. 4, bottom mold parts 9 are moved apart by a greater distance so that after the trimming element 21, as shown with arrow 23, has been moved laterally away, a plunger 25, after it is aligned axially to the bottom part 19, as indicated with another arrow 27 (this position is shown in FIG. 6), can enter between the opened bottom mold parts 9. At this point the cup-shaped bottom part 19 can be everted into the main part 18 of the container by a lifting motion as shown in FIG. 6 by the arrow 29. As shown in FIG. 7, the axial extension of the main part 18 of the container formed by the cup-shaped bottom part 19 is transferred into a bottom elevation 31 projecting into the interior of the container. The fill level then rises from the level 33 in FIG. 6 to the level 35 in FIG. 7. In the filling process, this liquid level change is taken into account with respect to calculating the filling amount.

Figure 8:
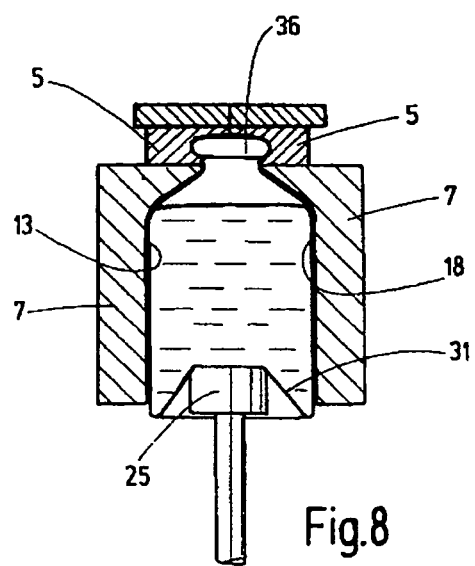
FIG. 8 is a schematic, side elevational view in section of the mold of FIG. 1 in the operating state with the raised fill level, but after formation of the head closure part of the container by closing of the head mold parts.

FIG. 8 differs from FIG. 7 merely in that by transferring the head mold parts 5 into the closed position. The mold of the head closure 36 is then formed. The head closure forming is affected, for example, supported by a vacuum, with the closing process caused by welding.

Figure 9:
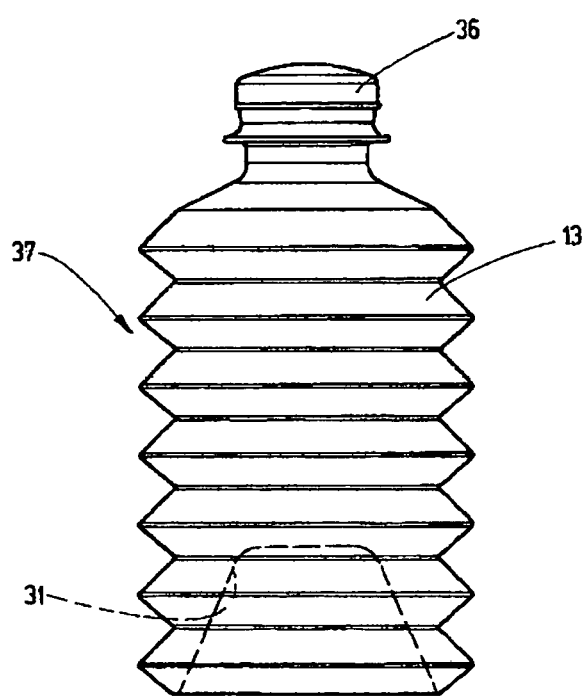
FIG. 9 is a side elevational view of one embodiment of a container produced according to the invention in the form of a bellows which can be axially pressed together.
Figure 10:
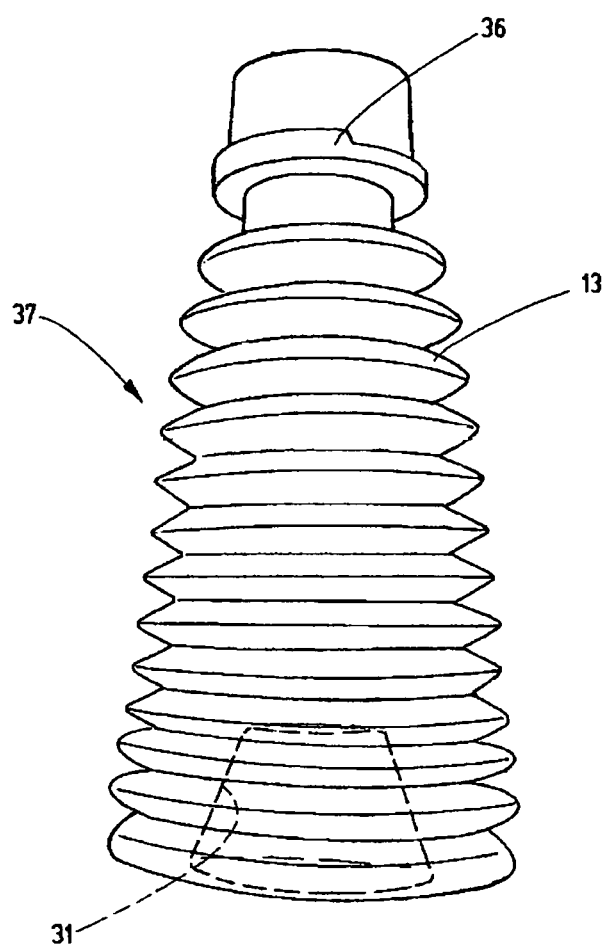
FIG. 10 is a perspective of another embodiment of the container with bellows tapering conically toward the head region.

While in FIGS. 1 to 8 the interior wall of the main mold parts 7 is shown and described as having a smooth surface, the blow mold can be designed in the conventional manner such that the main part of the container forms a bellows 37. FIG. 9 shows an embodiment of a container 13 formed in this way. Containers 13 made as bellows are preferably used to deliver the contents by axially pressing the bellows 37 together. The problem of a considerable residual volume remaining upon squeezing out is exacerbated in bellows because the bellows 37 can be axially shortened only until the folds are closed. A dead length remains corresponding at least to twice the wall thickness of the container, multiplied by the number of folds. The bottom elevation 31 provided according to the invention forms a displacement body filling the otherwise considerable residual volume when the bellows 37 are pressed together.

The invention claimed is:

1. A process for producing a thermoplastic container, the process comprising the steps of:
    extruding a thermoplastic tube along a longitudinal axis of a mold and between movable main and bottom mold parts thereof while the main and bottom mold parts are in open positions thereof and are laterally spaced relative to the longitudinal axis, said bottom mold parts being axial extensions of the main mold parts;

moving the main mold parts and the bottom mold parts laterally and translationally toward one another relative to the longitudinal axis and into closed positions thereof while the tube is positioned therebetween, the closed bottom mold parts welding a bottom end of the tube closed;

forming a container from the tube by exerting a pressure gradient on the tube to expand the tube against wall surfaces of the closed main and bottom mold parts, the bottom mold parts thus forming a container bottom end having a cup-shaped bottom container part extending axially from a main part of the container formed by the main mold parts;

while retaining the main mold parts in their closed positions, moving the bottom mold parts laterally and translationally apart relative to the longitudinal axis and independently of the main mold parts to provide a space therebetween; and axially inserting a plunger into the space created by independent movement of the bottom mold parts, upwardly from a location below the bottom mold parts, to deform a portion of the bottom container part into the main part of the container while the main part of the container remains retained by the closed main mold parts.

2. A process according to claim 1, wherein after independent movement of the bottom mold parts to create the space and before insertion of the plunger into the space, the process further comprises the steps of:

inserting a trimming element into the space; and
removing bottom scrap formed at the weld from the container with the trimming element.

3. A process according to claim 2 wherein
the trimming element and the plunger are moved, respectively, into axial alignment with the space before axial insertion into the space.

* * * * *